(12) United States Patent
Keyser et al.

(10) Patent No.: US 7,454,102 B2
(45) Date of Patent: Nov. 18, 2008

(54) OPTICAL COUPLING STRUCTURE

(75) Inventors: Thomas Keyser, Plymouth, MN (US); Grenville Hughes, Wayzata, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/412,738

(22) Filed: Apr. 26, 2006

(65) Prior Publication Data
US 2007/0253663 A1 Nov. 1, 2007

(51) Int. Cl.
*G02B 6/34* (2006.01)
*G02B 6/10* (2006.01)

(52) U.S. Cl. .................... 385/36; 385/14; 385/15; 385/31; 385/39; 385/49; 385/129; 385/130; 385/131

(58) Field of Classification Search .............. 385/36
See application file for complete search history.

(56) References Cited

U.S. PATENT DOCUMENTS

| | | | | |
|---|---|---|---|---|
| 4,059,338 A | * | 11/1977 | Hartelius, Jr. ............... | 385/36 |
| 4,234,357 A | | 11/1980 | Scheppele ................... | 148/1.5 |
| 4,315,693 A | | 2/1982 | Walker ....................... | 356/350 |
| 4,673,293 A | | 6/1987 | Sanders ...................... | 356/350 |
| 4,886,345 A | | 12/1989 | Popek ......................... | 350/355 |
| 4,958,898 A | | 9/1990 | Friedman et al. .......... | 350/96.14 |
| 5,029,978 A | | 7/1991 | Curtis et al. ............. | 350/96.29 |
| 5,090,810 A | | 2/1992 | Malvern ...................... | 356/350 |
| 5,143,577 A | | 9/1992 | Haas et al. .................. | 156/625 |
| 5,163,118 A | | 11/1992 | Lorenzo et al. ............. | 385/132 |
| 5,383,048 A | | 1/1995 | Seaver ........................ | 359/279 |
| 5,408,566 A | | 4/1995 | Eda et al. .................... | 385/131 |
| 5,429,981 A | | 7/1995 | Gardner et al. .............. | 437/60 |
| 5,500,544 A | | 3/1996 | Park et al. ................... | 257/296 |
| 5,696,662 A | | 12/1997 | Bauhahn .................... | 361/297.1 |
| 5,793,060 A | | 8/1998 | Morikawa ................... | 257/85 |

(Continued)

FOREIGN PATENT DOCUMENTS

GB 2 355 312 A 4/2001

(Continued)

OTHER PUBLICATIONS

Liu et al., "A High-Speed Silicon Optical Modulator Based on a Metal-Oxide-Semiconductor Capacity," Nature, vol. 427, Feb. 12, 2004. www.nature.com.

(Continued)

*Primary Examiner*—Frank G Font
*Assistant Examiner*—Ryan Lepisto
(74) *Attorney, Agent, or Firm*—McDonnell Boehnen Hulbert & Berghoff LLP

(57) ABSTRACT

An optoelectronic coupling structure, a method of manufacture, and a method of operation are described. The optical coupling structure includes a waveguide that is formed within a device layer of an SOI substrate. A prism is located on a bottom side of the SOI substrate. A BOX layer of the SOI substrate, which is interposed between the prism and the waveguide, serves as a spacer region, which promotes an optical coupling of the prism to the waveguide. By positioning the prism below the waveguide, an optoelectronic IC may more readily accommodate a prism. The prism may be directly fabricated in a bulk layer of the SOI substrate or directly bonded to a bottom side surface of the BOX layer.

20 Claims, 6 Drawing Sheets

U.S. PATENT DOCUMENTS

| | | | |
|---|---|---|---|
| 5,832,165 A | 11/1998 | Reichert et al. | |
| 5,841,931 A | 11/1998 | Foresi et al. | 385/131 |
| 5,861,651 A | 1/1999 | Brasen et al. | 257/411 |
| 5,908,305 A | 6/1999 | Crampton et al. | 438/141 |
| 6,063,299 A | 5/2000 | Drake et al. | 216/24 |
| 6,108,212 A | 8/2000 | Lach et al. | 361/768 |
| 6,137,117 A | 10/2000 | Feldstein et al. | |
| 6,147,362 A | 11/2000 | Keyser | 257/59 |
| 6,150,266 A | 11/2000 | Lin et al. | 438/682 |
| 6,270,604 B1 | 8/2001 | McCallion et al. | 156/99 |
| 6,311,003 B1 | 10/2001 | Dubey et al. | 385/130 |
| 6,323,985 B1 | 11/2001 | Maloney | 359/248 |
| 6,372,609 B1 | 4/2002 | Aga et al. | 438/459 |
| 6,418,999 B1 | 7/2002 | Yanagita et al. | 156/584 |
| 6,493,089 B2 | 12/2002 | Numai | 356/461 |
| 6,493,502 B1 | 12/2002 | Deliwala | 385/140 |
| 6,526,187 B1 | 2/2003 | Deliwala | 385/11 |
| 6,546,538 B1 | 4/2003 | Rubdi et al. | 716/12 |
| 6,566,155 B1 | 5/2003 | Numai | 438/31 |
| 6,587,605 B2 | 7/2003 | Paniccia et al. | |
| 6,603,166 B2 | 8/2003 | Fechner et al. | 257/301 |
| 6,603,889 B2 | 8/2003 | Deliwala | 385/8 |
| 6,608,945 B2 | 8/2003 | Deliwala | 385/2 |
| 6,611,636 B2 | 8/2003 | Deliwala | 385/14 |
| 6,625,348 B2 | 9/2003 | Deliwala | 385/27 |
| 6,627,954 B1 | 9/2003 | Seefeldt | 257/350 |
| 6,646,747 B2 | 11/2003 | Deliwala | 356/477 |
| 6,654,511 B2 | 11/2003 | Delwala | 385/2 |
| 6,656,747 B2 | 12/2003 | Sameshima | 438/3 |
| 6,658,173 B2 | 12/2003 | Delwala | 385/15 |
| 6,671,443 B2 | 12/2003 | Deliwala | 358/125 |
| 6,690,844 B2 | 2/2004 | Deliwala | 385/2 |
| 6,690,863 B2 | 2/2004 | Deliwala | 385/50 |
| 6,693,225 B2 | 2/2004 | Boyer et al. | 585/265 |
| 6,738,546 B2 | 5/2004 | Deliwala | 385/50 |
| 6,743,662 B2 | 6/2004 | Fathimulla et al. | 438/118 |
| 6,748,125 B2 | 6/2004 | Deliwala | 385/2 |
| 6,760,498 B2 | 7/2004 | Delwala | 385/14 |
| 6,816,636 B2 | 11/2004 | Cole et al. | 385/10 |
| 6,819,814 B2 | 11/2004 | Forrest et al. | 385/14 |
| 6,823,112 B2 | 11/2004 | Deliwala | 385/37 |
| 6,826,320 B2 | 11/2004 | Deliwala | 385/14 |
| 6,842,546 B2 | 1/2005 | Deliwala | 385/14 |
| 6,845,198 B2 | 1/2005 | Montgomery et al. | 385/50 |
| 6,850,683 B2 | 2/2005 | Lee et al. | 385/129 |
| 6,868,214 B1 | 3/2005 | Sakata et al. | 385/129 |
| 6,869,881 B2 | 3/2005 | Deliwala | 438/689 |
| 6,879,751 B2 | 4/2005 | Deliwala | 385/25 |
| 6,888,219 B2 | 5/2005 | Keyser | 257/532 |
| 6,891,685 B2 | 5/2005 | Deliwala et al. | 359/831 |
| 6,891,985 B2 | 5/2005 | Delwala | 385/14 |
| 6,895,136 B2 | 5/2005 | Deliwala | 385/14 |
| 6,897,498 B2 | 5/2005 | Gothoskar et al. | 257/226 |
| 6,898,352 B2 | 5/2005 | Delwala | 385/40 |
| 6,912,330 B2 | 6/2005 | Deliwala | 385/14 |
| 6,917,727 B2 | 7/2005 | Gunn, III et al. | 385/14 |
| 6,917,730 B2 | 7/2005 | Ghiron et al. | 385/14 |
| 6,919,238 B2 | 7/2005 | Bohr | 438/166 |
| 6,934,444 B2 | 8/2005 | Ghiron et al. | 385/36 |
| 6,944,369 B2 | 9/2005 | Deliwala | 385/30 |
| 6,947,615 B2 | 9/2005 | Deliwala | 385/5 |
| 6,963,118 B2 | 11/2005 | Deliwala | 257/428 |
| 6,968,110 B2 | 11/2005 | Patel et al. | 385/131 |
| 6,980,720 B2 | 12/2005 | Gothoskar et al. | 385/43 |
| 6,987,910 B2 | 1/2006 | Shappir et al. | 385/37 |
| 6,993,225 B2 * | 1/2006 | Patel et al. | 385/43 |
| 6,993,243 B2 | 1/2006 | Delwala | 385/147 |
| 7,000,207 B2 | 2/2006 | Gothoskar et al. | 716/8 |
| 7,003,196 B2 | 2/2006 | Ghiron et al. | 385/36 |
| 7,013,067 B2 | 3/2006 | Ghiron et al. | 385/39 |
| 7,020,364 B2 | 3/2006 | Ghiron et al. | 385/36 |
| 7,079,742 B1 | 7/2006 | Gunn, III et al. | 385/129 |
| 7,118,682 B2 | 10/2006 | Patel et al. | 216/24 |
| 7,149,388 B2 | 12/2006 | Keyser et al. | 385/40 |
| 7,177,489 B2 | 2/2007 | Keyser et al. | 385/1 |
| 7,217,584 B2 | 5/2007 | Yue et al. | 438/31 |
| 2002/0003650 A1 | 1/2002 | Usami et al. | 359/248 |
| 2002/0164143 A1 | 11/2002 | Csutak et al. | 385/131 |
| 2002/0172464 A1 | 11/2002 | Delwala | 385/40 |
| 2002/0185675 A1 | 12/2002 | Furukawa | 257/327 |
| 2003/0026513 A1 | 2/2003 | Deliwala | 385/2 |
| 2003/0026571 A1 | 2/2003 | Bazylenko | 385/129 |
| 2003/0054639 A1 | 3/2003 | Deliwala | 438/689 |
| 2003/0059190 A1 | 3/2003 | Gunn, III et al. | 385/130 |
| 2003/0063364 A1 | 4/2003 | Kambe | 359/245 |
| 2003/0081924 A1 | 5/2003 | Yegnanarayanan et al. | 385/132 |
| 2003/0098289 A1 | 5/2003 | Zheng et al. | 216/24 |
| 2003/0102079 A1 | 6/2003 | Kalvesten et al. | 156/299 |
| 2003/0151793 A1 | 8/2003 | Sugiyama et al. | 359/279 |
| 2003/0184950 A1 | 10/2003 | Nakamura | 361/303 |
| 2003/0207215 A1 | 11/2003 | Xu et al. | 430/321 |
| 2003/0223671 A1 | 12/2003 | Morse | 385/14 |
| 2004/0002197 A1 | 1/2004 | Fathimulla et al. | 438/455 |
| 2004/0021157 A1 | 2/2004 | Yue et al. | 257/288 |
| 2004/0041232 A1 | 3/2004 | Keyser | 257/516 |
| 2004/0114869 A1 | 6/2004 | Fike et al. | 385/43 |
| 2004/0126051 A1 | 7/2004 | Bruel | 385/14 |
| 2004/0151463 A1 | 8/2004 | Talin et al. | 385/131 |
| 2004/0190826 A1 | 9/2004 | Ghiron et al. | |
| 2004/0202418 A1 | 10/2004 | Ghiron et al. | 385/36 |
| 2004/0207016 A1 | 10/2004 | Patel et al. | 257/347 |
| 2004/0208454 A1 | 10/2004 | Montgomery et al. | 385/50 |
| 2004/0223768 A1 | 11/2004 | Shastri et al. | 398/183 |
| 2004/0240822 A1 | 12/2004 | Patel et al. | 385/130 |
| 2004/0258347 A1 | 12/2004 | Gothoskar et al. | 385/14 |
| 2005/0094938 A1 | 5/2005 | Ghiron et al. | 385/36 |
| 2005/0094939 A1 | 5/2005 | Ghiron et al. | 385/36 |
| 2005/0110108 A1 | 5/2005 | Patel et al. | 257/453 |
| 2005/0123232 A1 | 6/2005 | Piede et al. | 385/14 |
| 2005/0123259 A1 | 6/2005 | Gunn, III et al. | 385/129 |
| 2005/0135727 A1 | 6/2005 | Piede et al. | 385/14 |
| 2005/0152658 A1 | 7/2005 | Keyser | 385/129 |
| 2005/0175286 A1 | 8/2005 | Patel et al. | |
| 2005/0179986 A1 | 8/2005 | Gothoskar et al. | 359/321 |
| 2005/0189591 A1 | 9/2005 | Gothoskar et al. | 257/347 |
| 2005/0194990 A1 | 9/2005 | Gothoskar et al. | 324/765 |
| 2005/0201683 A1 | 9/2005 | Ghirono et al. | 385/39 |
| 2005/0207691 A1 | 9/2005 | Keyser et al. | 385/1 |
| 2005/0207704 A1 | 9/2005 | Keyser et al. | 385/40 |
| 2005/0213873 A1 | 9/2005 | Piede et al. | 385/14 |
| 2005/0214589 A1 | 9/2005 | Keyser | 438/155 |
| 2005/0220405 A1 | 10/2005 | Shappir et al. | 385/37 |
| 2005/0236619 A1 | 10/2005 | Patel et al. | 257/57 |
| 2005/0289490 A1 | 12/2005 | Shastri et al. | 716/4 |
| 2006/0018597 A1 | 1/2006 | Piede et al. | 385/39 |
| 2006/0038144 A1 | 2/2006 | Maddison | 250/559.05 |
| 2006/0063679 A1 | 3/2006 | Yue et al. | 505/190 |
| 2006/0083144 A1 | 4/2006 | Piede et al. | 369/100 |
| 2007/0000862 A1 | 1/2007 | Patel et al. | 216/24 |
| 2007/0101927 A1 | 5/2007 | Keyser et al. | 117/20 |
| 2007/0109549 A1 | 5/2007 | Sanders et al. | 356/469 |
| 2007/0133003 A1 | 6/2007 | Sanders et al. | 356/461 |

FOREIGN PATENT DOCUMENTS

| | | |
|---|---|---|
| JP | 06029314 | 4/1994 |
| WO | WO 02/069026 A2 | 9/2002 |
| WO | WO 03/023468 A1 | 3/2003 |
| WO | WO 03/077015 | 9/2003 |
| WO | WO 03/077015 A1 | 9/2003 |
| WO | WO 2004/088394 A2 | 10/2004 |
| WO | WO 2004/088396 A2 | 10/2004 |
| WO | WO 2004/088715 A2 | 10/2004 |
| WO | WO 2004/095084 A2 | 11/2004 |

WO WO 2004/095112 A2 11/2004

OTHER PUBLICATIONS

U.S. Appl. No. 60/458,501, filed Mar. 28, 2003, Patel et al.
U.S. Appl. No. 60/457,242, filed Mar. 25, 2003, Montgomery et al.
U.S. Appl. No. 60/464,491, filed Apr. 21, 2003, Patel et al.
U.S. Appl. No. 11/342,158, filed Jan. 27, 2006.
U.S. Appl. No. 11/406,939, filed Apr. 18, 2006.
U.S. Appl. No. 11/271,107, filed Nov. 10, 2005.
U.S. Appl. No. 11/811,767, filed Mar. 29, 2004.
U.S. Appl. No. 10/755,212, filed Jan. 12, 2004.
U.S. Appl. No. 11/224,808, filed Sep. 13, 2005.
U.S. Appl. No. 11/557,185, filed Nov. 7, 2006.
U.S. Appl. No. 60/863,778, filed Oct. 31, 2006, Keyser et al.
U.S. Appl. No. 60/863,766, filed Oct. 31, 2006, Keyser et al.
U.S. Appl. No. 60/831,181, filed Jul. 14, 2006, Keyser.
U.S. Appl. No. 60/611,210, filed Sep. 17, 2004, Keywer.
Ahmed et al., "Nitrided Thermal SiO2 for Use as Top and Bottom Gate Insulators in Self-Aligned Double Gate Silicon-on-Insulator Metal-Oxide-Semiconductor Field Effect Transistor", Journal of Vacuum Science & Technology B (Microelectronics and Nanometer Structures) AIP for American Vacuum Soc., vol. 19, No. 3, May 2001, pp. 800-806.
Celler et al., "Smart Cut TM. A guide to the Technology, the Process, the Products", SOITEC, Jul. 2003, 1-8.
Celler et al., "Strained Silicon on Insulator. A quick Guide to the Technology, the Processes, the Products", SOITEC, Jul. 2003, 1-4.
Hilleringmann et al., "Optoelectronic System Integration on Silicon Waveguides, Photodetectors, and VLSI CMOS Circuits in One Chip", IEEE Transactions on Electron Devices, 42 (1995) Mai, No. 5, New York, NY, US pp. 841-846.
Joshi et al., "Oxynitride Gate Dielectrics for p+ Polysilicon Gate MOS Devices", IEEE Electron Devices Letters, vol. 14, No. 12, Dec. 1993, pp. 560-562, XP000418671.

Ling Liao et al., "Optical Transmission Losses in Plycrystalline Silicon Strip Waveguides: Effects on Waveguide Dimensions, Thermal Treatment Hydrogen Passivation, and Wavelength", Journal of Electronic Materials, vol. 29, No. 12, 2002, 1380.
Liu et al., "Fast Silicon Optical Modulator", Proc. Of the SPIE-Optoelectronic Integration on Silicon, Jul. 2004, vol. 5357, pp. 35-44.
Png et al., "Development of Small Silicon Modulators in Silicon-on Insulator (SOI)", Proceedings of the SPI, SPIE, Bellingham, VA, vol. 4997, 2003, pp. 190-197.
Reed, G.T., et al., "Silicon on Insulator Optical Waveguides Formed by Direct Wafer Bonding", Materials Science and Engineering B, Elsevier Sequoia, Lausame, Ch. vol. B15, No. 2, Nov. 1, 1992, pp. 156-159.
Samara-Rubio D. et al., "A Gigahertz Silicon-on-Insulator Mach-Zehnder Modulator", Optical Fiber Communication Conference, 2004. OFC 2004 Los Angeles, CA USA, Feb. 23-25, 2004, IEEE, Feb. 26, 2004, pp. 701-703, XP10745963.
Singh Jagar et al., "Design Methodology of the High Performance Large-Grain Polysilicon MOSFET", IEEE Transactions on Electron Devices, vol. 49, No. 5, May 2002, 795-801.
Waldron et al., "Optical Modulator in Silicon-on-Insulator with a Low Thermal Signature", J. Vac. Sci. Thechnol. A 22(3) May/Jun. 2004, 2004 American Vacuum Society.
European Search Report for 07106879.5-1524 date Jul. 7, 2007.
Ahmed et al., "Nitrided Thermal SiO2 for Thin Buried Gate Insulator in Dual Gate SOI-MOSFET", University/Government Industry Microelectronics Symposium, 1999 Proceedings of the Thirteenth Biennial Minneapolis, MN Jun. 20-23, 1999, Piscatatway, NJ, IEEE, Jun. 20, 1999, pp. 43-46.

* cited by examiner

OPTICAL COUPLING STRUCTURE

FIELD

The present invention relates generally to optoelectronic integrated circuits and more particularly to an optical coupling structure that includes a silicon-based prism coupled with a waveguide. A method of making the structure using a silicon-on-insulator (SOI) substrate is also disclosed.

BACKGROUND

Optoelectronic integrated circuits (ICs) include both electronic and optical elements within a single chip. Typical electronic elements include field effect transistors, capacitors, and, resistors; typical optical elements include waveguides, optical filters, modulators, and photodetectors. Within a given optoelectronic IC, some of the electronic elements may be dedicated to handling tasks such as data storage and signal processing. Other electronic elements may be dedicated to controlling or modulating the optical elements. Including both types of elements on a single chip provides several advantages, which include reduced layout area, cost, and operational overhead. In addition, such integration yields hybrid devices, such as an opto-isolator.

The integration of optical and electronic elements has been greatly facilitated by the maturation of today's semiconductor processing techniques. For instance, conventional processing techniques may be adapted to create silicon-based prisms, waveguides, and other optical devices.

One device, however, that has been difficult to integrate is a silicon based laser or light source. As a result, most optoelectronic ICs are adapted to receive an externally applied light beam from a laser or an optical fiber. Unfortunately, introducing a light beam to an IC can often be difficult. For example, in order for an optoelectronic IC to accommodate a light beam, the spot size and the numerical aperture (NA) of the beam may need to be appropriately matched to optical elements within an IC.

To overcome these difficulties, previous methods use a silicon-based prism to couple a light beam into and out of a waveguide. To couple light into the waveguide, the prism receives an externally applied light beam and refracts it to a coupling region. The coupling region then provides the refracted light beam to the waveguide. A reverse scenario moves a light beam away from the waveguide, into a coupling region, which transfers the light beam into the prism. The prism then refracts the light beam out of the prism. To provide an evanescent coupling, the prism should be located within close proximity of the waveguide and should have an index of refraction that is greater than or equal to that of the waveguide. Further, the separation distance between the prism and waveguide should be small (on the order of 1000's of Angstroms) and the index of the medium that separates the two must be smaller than the indexes of both the prism and the waveguide. In many scenarios, the index of the prism ($n_1$) is larger than the index of the separation medium ($n_2$) and larger than or equal to the index of the waveguide ($n_3$).

In general, optoelectronic ICs are fabricated in SOI based substrates. Advantageously, SOI substrates provide a thin device layer located on top of a buried oxide (BOX) layer. The device layer is used for a waveguide and the BOX layer serves as a cladding layer of the waveguide. FIG. 1 shows an SOI substrate 10 that includes a device layer 12, a BOX layer 14, and a bulk layer 16. The device layer 12 includes a waveguide 18. Above the waveguide 18 are a coupling region 20 and a prism 22 for optically coupling a light beam into the waveguide 18. The coupling region 20 is an oxide layer that is either grown or deposited between the waveguide 18 and the prism 22 The prism 22 is a silicon based prism that is bonded to the coupling region 20. The BOX layer 16 and a thick oxide layer 24 serve as cladding layers of the waveguide 18, and both layers 16, 24 have a thickness that is on the order of 1 um for sufficiently confining a light beam to the waveguide 18.

Additionally, FIG. 1 shows a silicon-oxide-silicon modulator 28 located above the waveguide 18 (where a portion of the waveguide 18 silicon serves as a lower plate in the modulator 28) and a field effect transistor (FET) 30 adjacent to the waveguide 18. An oxide region 32, interposed between the FET 30 and the waveguide 18, provides electrical isolation. When the modulator 28 receives a voltage bias, it may adapt the optical properties of a light beam within the waveguide 18. The FET 30 may be included in a variety of modulator bias controls, signal processing, switching, or data storage related circuits, for instance.

To effectively couple a light beam into the waveguide 18, the prism 22 includes a tapered surface 34, which allows a variety of incident angles to be achieved. The prism 22 may also include an anti-reflective coating that reduces Fresnel losses. FIG. 1 shows a light beam 36 incident on the tapered surface 34. Typically light beams used in optoelectronic ICs are in the infrared range of about 1-5 µm, which is transparent to silicon. The prism 22 refracts the beam 36 and the coupling region 20 then assists in coupling the beam 36 to the waveguide 18. The waveguide 18 may then provide the beam 36 to other portions of an IC, or another optical coupling structure, which may draw the beam 36 out of the waveguide 18. For instance, FIG. 1 shows a prism 38 and an coupling region 40, which together may draw the beam 36 out of the waveguide 18.

One problem with current optoelectronic coupling structures is that bonding the prism to the coupling region is difficult. Typically, prisms are fabricated separately from a substrate and then later aligned to a coupling region and bonded. The alignment and bonding can be a labor intensive, time consuming task, which reduces throughput and makes larger scale production less feasible. In addition, interconnects, which electrically couple together various electronic elements, must also accommodate a prism. Often this leads to an increased number of restrictions in the layout rules of the contacts, vias, metal interconnects, and electrical and optical elements within a given optoelectronic IC.

SUMMARY

An optoelectronic coupling structure, a method of manufacture, and a method of operation are described. The optical coupling structure includes a waveguide, a coupling region, and a prism. The optical structure is fabricated within an SOI substrate that includes a device layer, a BOX layer, and a bulk layer. The waveguide and the prism are located on opposite sides of the SOI substrate. The waveguide, which is located in the device layer, is on the top side of the SOI substrate. The prism, on the other hand, is located on the other side of the SOI substrate. Advantageously, the BOX layers serves as a spacer region between the prism and the waveguide.

In one example, an etch process forms the prism in the bulk layer. Instead of the prism being bonded to a coupling region above the device layer, the bottom side of the SOI substrate is patterned and etched. The etch process creates a prism that is within close proximity to both the waveguide and the coupling region. Because the BOX layer is grown from the bulk layer, an inherent bond naturally exists between the prism and the coupling region. Moreover, the BOX layer/prism interface is relatively defect free (relative to a prism that may have been bonded to a substrate).

In another example, the prism is separately fabricated and later bonded to the bottom side of the SOI substrate. An etch process may first remove a portion of the bulk layer in order to provide a bonding surface on an exposed portion of the BOX layer. A bonding process may then bond the prism to the BOX layer.

In another example, the BOX layer is about 2500 Angstroms or less in thickness. The prism may be adjacent to a cavity that is below the waveguide and the BOX layer. Because the BOX layer is less than 2500 Angstroms, the BOX layer may not be sufficiently thick enough to adequately confine a light beam to the waveguide. Therefore, the cavity increases the cladding thickness of the waveguide by using air, or by being filled with an oxide, a nitride or other low index material. The cavity may also truncate a refracted light beam within the prism to provide a more efficient coupling.

In yet another respect, the prism may be formed at any point of a manufacturing process. For instance, the prism may be formed before or after optical and electronic elements are formed in the SOI substrate. The prism may also be formed after inter-level dielectrics, metal interconnects, and various other metal layers are deposited. As a result, layout requirements do not need to be restricted to accommodate the prism.

A variety of manufacturing techniques associated with conventional semiconductor processing may be used to create the prism. Alternatively, adapted tooling and processes may also be used to properly align a prism with a waveguide and a coupling region. For instance, a mask aligner (e.g., a stepper) having a camera for bottom and top side alignment may ensure that a photoresist mask is aligned with a top side waveguide. The mask aligner may include an infrared laser source that optically detects desired structures in which a prism is to be aligned.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Certain example embodiments are described below in conjunction with the appended drawing figures, wherein like reference numerals refer to like elements in the various figures, and wherein.

DETAILED DESCRIPTION

In one form or another, the various embodiments describe an optical coupling structure that receives a light beam and couples the beam into a waveguide. In a reverse manner, the optical coupling structure may also move light away from the waveguide and out of an optoelectronic IC. The methods of fabricating such an optical structure described below implement a variety of conventional semiconductor processes and combinations thereof, which include: lithography, etching, thin-film deposition, and anti-reflective coatings. Moreover, some of the embodiments also include methods that may employ conventional wafer to wafer attachment/bonding processes.

For simplicity, the description below and related figures describe an optical coupling structure that includes a silicon-based waveguide that consists of single crystalline silicon layer. In alternative embodiments the waveguide may be polycrystalline silicon and it may also comprise multiple layers with specific characteristics for each individual layer (i.e., doping, thickness, resistivity, etc.). The thickness of the waveguide may be tailored to accommodate one or more modes of a propagating light beam. In addition, although the described embodiments below use silicon-based optical elements, other types of high index materials (i.e., gallium arsenide, lithium niobate, indium phosphide, etc.) may replace silicon-based elements. Further, the waveguide, prism, and coupling regions may take on a variety of shapes and sizes. In general, the term prism refers to any device that may receive a light beam and produce a desired refraction.

Figure 1:
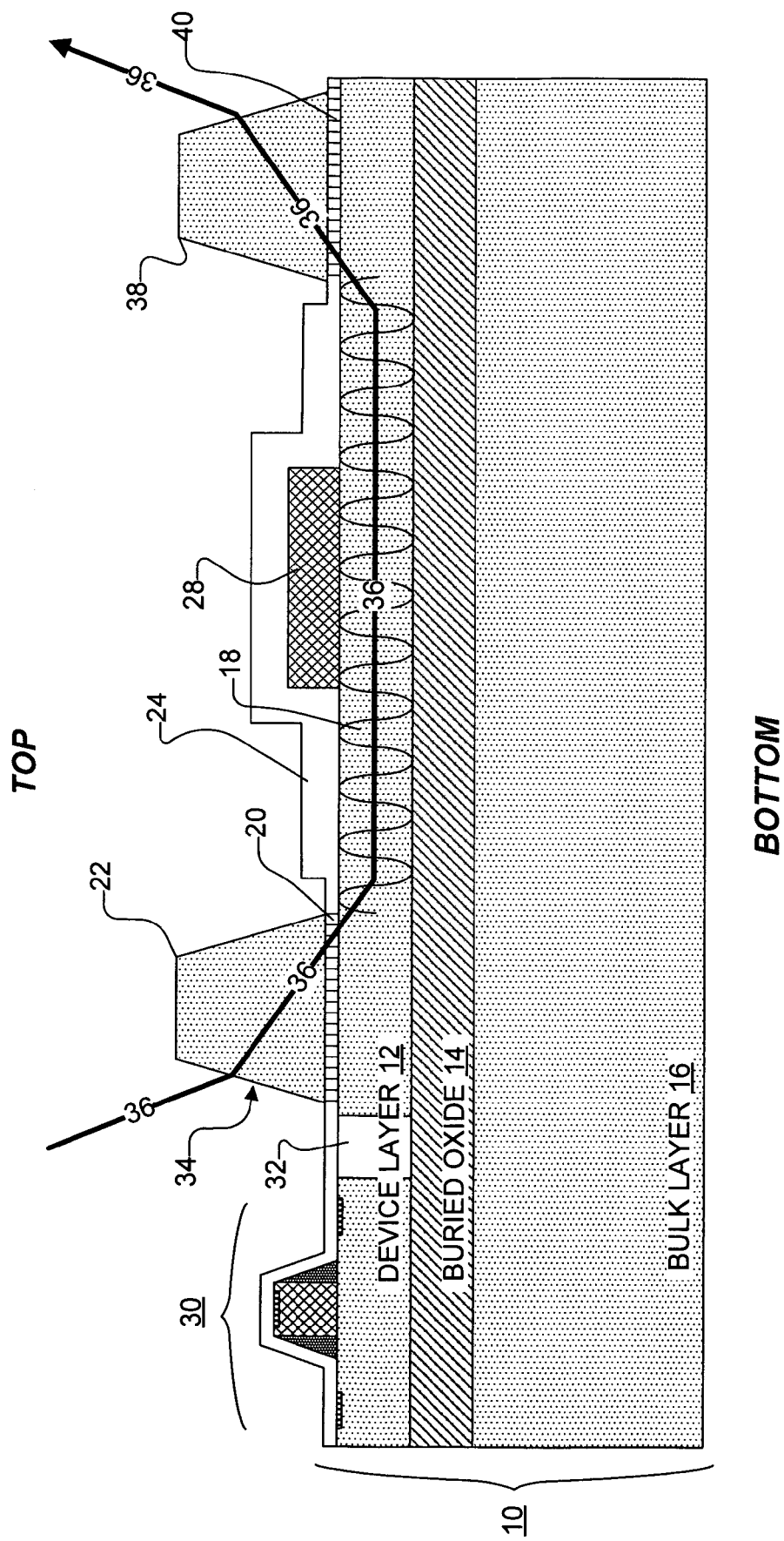
FIG. 1 is a cross section of a prior art optical coupling structure, according to an example.
Figure 2:
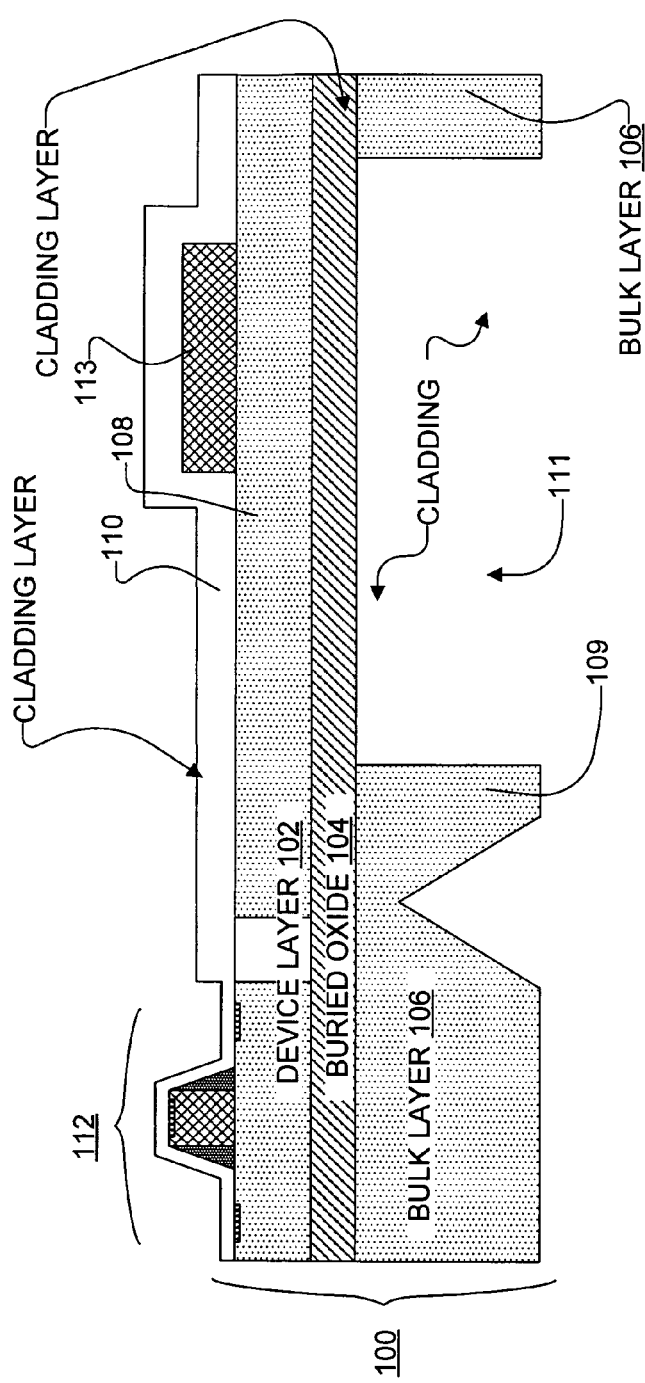
FIG. 2 is a cross section of an optical coupling structure, according to an example.

Turning now to the figures, FIG. 2 is a cross-section of an optical coupling structure. The optical coupling structure is formed in an SOI substrate 100 that includes a device layer 102, a BOX layer 104, and a bulk layer 106. The device layer 102 is located on the top side of the SOI substrate 100 and the bulk layer 106 is located on the bottom side of the SOI substrate 100. The BOX layer 104 is located substantially between the device layer 102 and the BOX layer 104. The device layer 102 includes a waveguide 108, which may be tailored to a variety of thickness in order to achieve desired optical characteristics of the waveguide (e.g., mode selection).

To introduce a light beam into the waveguide 108 or draw light out of the waveguide 108, the BOX layer 104 serves as a spacer in order to accurately set distance between a prism and the 108 waveguide and as a result, enable efficient and repeatable coupling of light into and out of the waveguide 108. Thus, BOX layer 104 should be thin enough (about 2500 Angstroms or less) to provide an adequate coupling between the prism 109 and the waveguide 108.

To efficiently guide the light beam, the waveguide 108 should be surrounded by cladding layers that have a low index and sufficient thickness. To clad the waveguide 108, an oxide layer 110 is grown or thermally deposited above the waveguide 108. In one example, the thickness of the cladding layers should be about 1 um or more. The BOX layer 104 may also serve as a partial cladding layer below the waveguide 108. A cavity 111, which increases the thickness of the bottom cladding, is described with reference to FIG. 3.

FIG. 2 also shows a FET 112 and a modulator 113 located within a vicinity of the waveguide 108. It should be noted that a variety of other optical elements may exist within or above the SOI substrate 100. In alternative examples, the waveguide 108 may be formed after the prism 109 is formed in the bottom side of the SOI substrate 100.

Figure 3A:
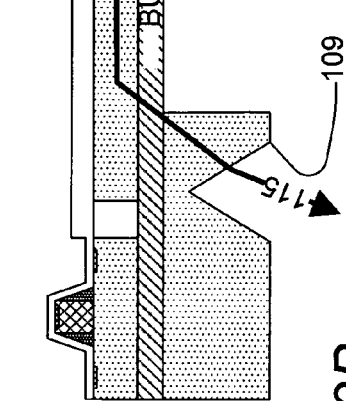
FIGS. 3A and 3B are cross sections showing a light beam being evanescently coupled into and out of a waveguide, according to an example.
Figure 3B:
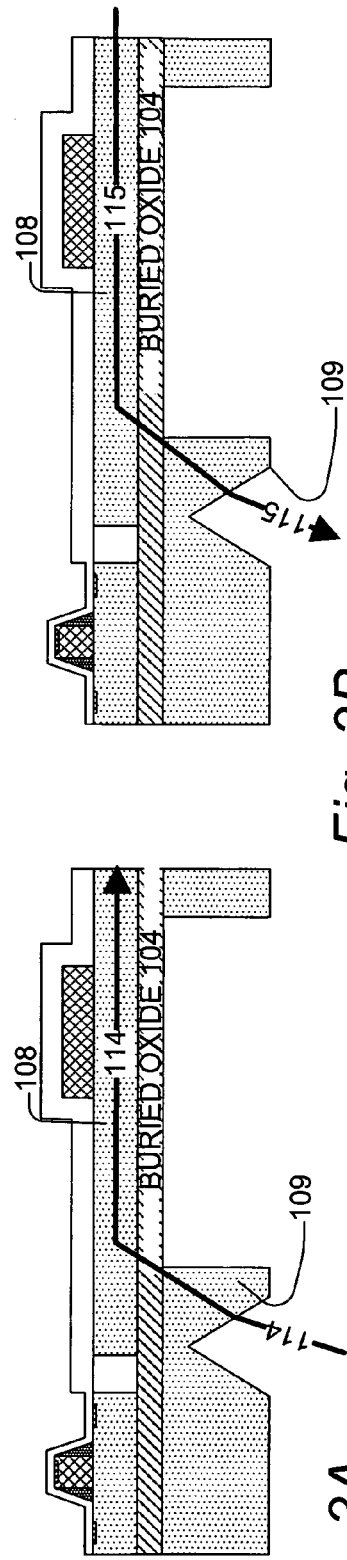

FIGS. 3A and 3B show at least two operating scenarios of the optical coupling structure of FIG. 2. To bring light into the waveguide 108, FIG. 3A shows a light beam 114 that enters the prism 109 and refracts. BOX layer 104 assists in coupling beam 114 to the waveguide 108 To bring light out of the waveguide 108, FIG. 3B shows a light beam 115 that transfers out of the waveguide 108 through the BOX layer 104 to the prism 124. It should be noted that at least a portion of the waveguide 108 and the prism 109 may be used to couple light into and out of the waveguide 108.

Figure 4:
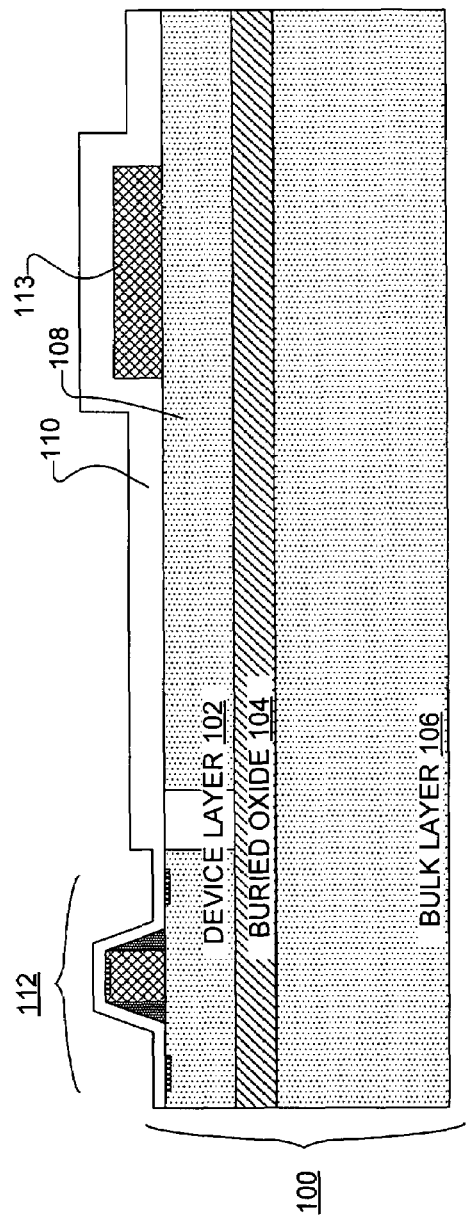
FIG. 4 is a cross section of an SOI substrate, according to an example.

FIG. 4 shows a cross-section of the SOI substrate 100 before the cavity 111 and the prism 109 are formed. Advantageously the SOI substrate 100 may be provided at any point during a semiconductor process, such as after microelectronic devices are formed. FIG. 4 shows this example.

Figure 5:
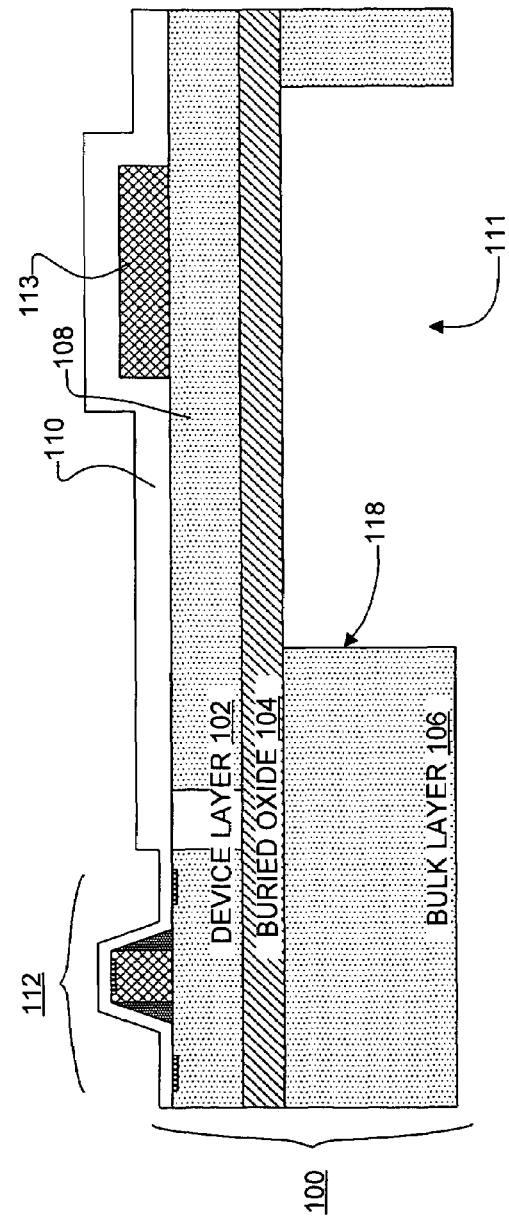
FIG. 5 is another cross section of an SOI substrate with a cavity located in the bulk layer, according to an example.

FIG. 5 shows a cross-section of the SOI substrate 100 that includes the cavity 111, which, for instance, may have been created by a lithography process in combination with an etching step (i.e., a wet or dry etch). Cavity 111 should be aligned underneath the waveguide 108. In order to align the cavity 111, a mask aligner (e.g. a stepper) may include a camera for aligning a mask to features on the top side of the SOI substrate 100. Other methods of alignment include using an IR laser to detect and align front side features with a bottom side mask. In such examples, alignment marks, which can be recognized by the mask aligner, may be patterned into an appropriate layer of the SOI substrate 100 to enable registration of a backside pattern to a front side (or vice versa).

The purpose of the cavity 111 may be at least two fold. Because the BOX layer 104 is thinner than a conventional oxide cladding layer (typically, about 1 um or more), the cavity 111 compensates for a lesser thickness of the BOX layer 104. The combination of the BOX layer 104 and the cavity 111 serve as the bottom cladding of the waveguide 108. The cavity 111 may also be filled with a material, such as an oxide or a nitride, as long as the index of the filled cavity remains less than that of the waveguide 108.

The cavity 111 may also truncate light that propagates through the prism 109. A cavity edge 118 provides a transition between a low index medium (the cavity 111) and a high index medium (the bulk layer 106), which provides a truncation of light at the BOX layer 104/prism 109 interface. The sharper the truncation, the better the coupling efficiency may be between the prism 109 and waveguide 108.

Figure 6:
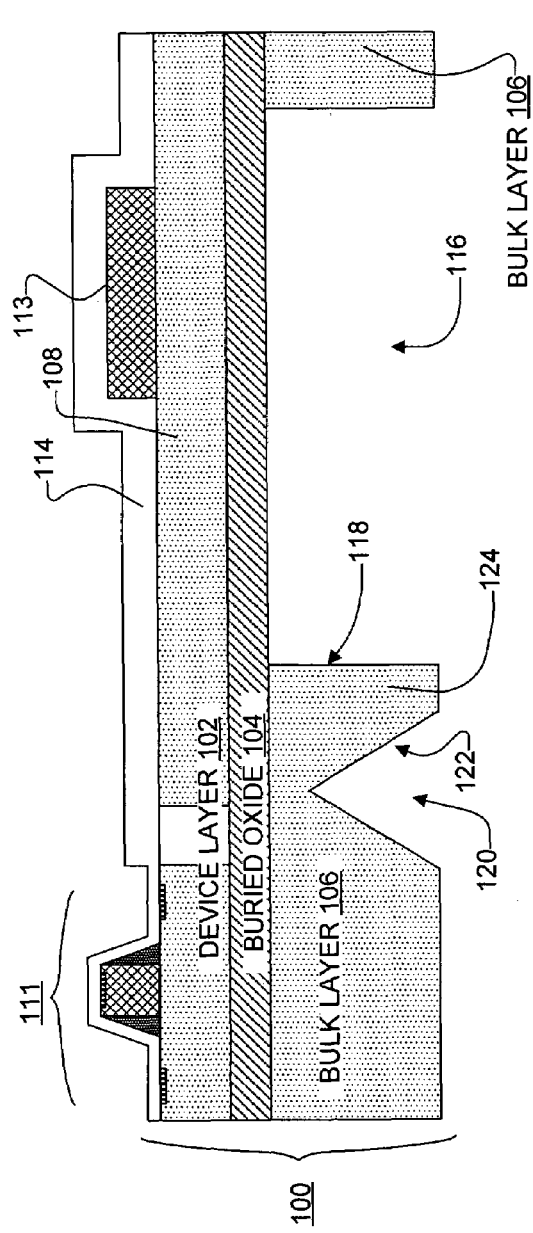
FIG. 6 is a cross section of an SOI substrate with a cavity and a groove located in the bulk layer, according to an example.

To form the prism 109, an additional lithography step and etch step define a tapered surface for receiving or outputting a light beam. FIG. 6 shows an upside down "V" shaped groove 120 formed in the bulk layer 106. An isotropic or an anisotropic etch may create the groove 120, according to a variety of orientations, such as a preferred crystallographic orientation, for instance. The etch may create a tapered surface 122 for receiving or outputting a beam of light. In general, a crystollagraphic etch using tetramethylammonium hydroxide (TMAH) or potassium hydroxide (KOH), for example, may be used to create a controlled and repeatable angle of the tapered surface 122 with respect to the SOI substrate 100. (Typically, the angle is about 54 degrees, but other etches could create a variety of other angles.).

Although the groove is shown as an upside down "V-shaped groove," other types of grooves and tapered surfaces are also possible. The cavity etch and the groove etch create the prism 109 that includes the groove 120 and is defined by the cavity edge 118. In some examples the groove 120 may be formed before the cavity edge 118.

Figure 7:
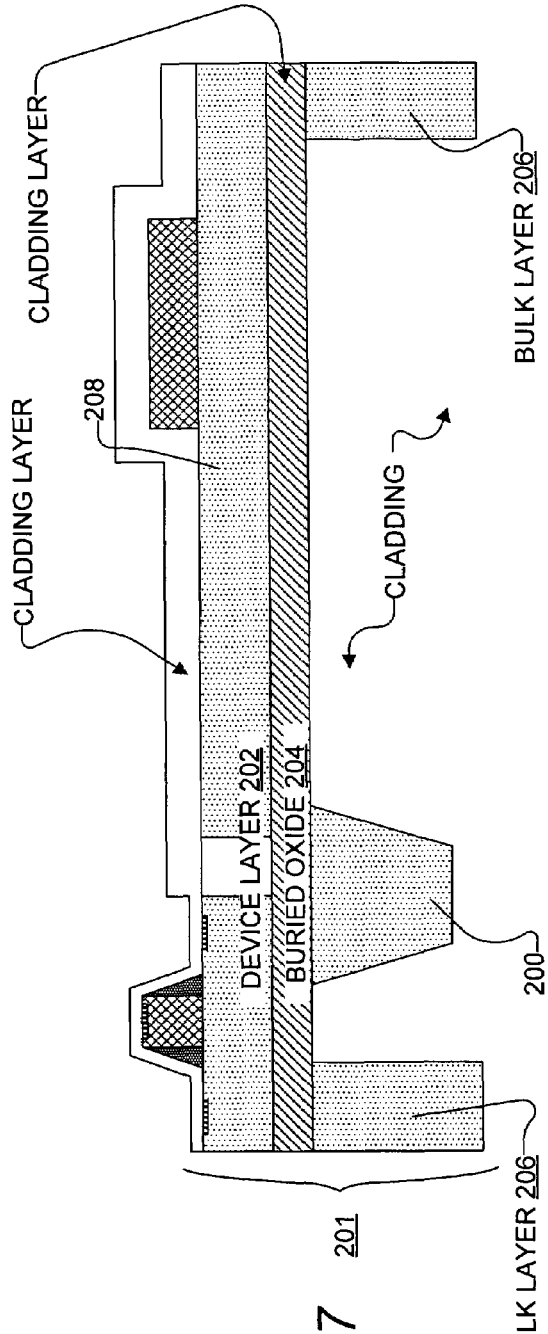
FIG. 7 is a cross section of another optical coupling structure, according to an example.

Because the prism 109 is formed in bulk layer 106, the prism 109 is inherently bonded to a portion of the BOX layer 104. Consequently, a relatively defect free bond may exist been the prism 109 and the bulk layer 106. As another example, however, FIG. 7 shows a prism 200 that is bonded to the bottom side of an SOI substrate 201, which includes a device layer 202 located on top of a BOX layer 204. The device layer 202 also includes a waveguide 208. The BOX layer 204 is located on top of a bulk layer 206. Instead of forming the prism 201 out of the bulk layer 206, a portion of the bulk layer 206 may be removed, exposing a portion of the BOX layer 204. The prism 200, which may be selected from a variety of pre-fabricated prisms, may then be bonded to the BOX layer 204.

Figure 8A:
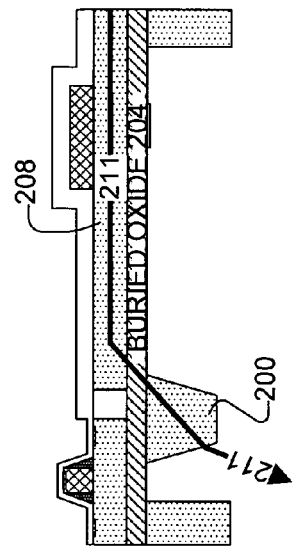
FIGS. 8A and 8B are cross sections showing a light beam being evanescently coupled into and out of a waveguide, according to an example.
Figure 8B:
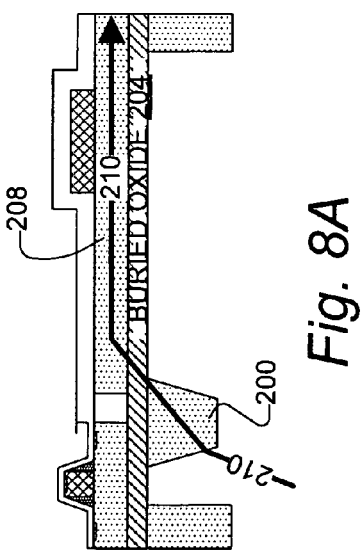

The prism 200 and the waveguide 208 may be operated in a similar manner to the optical coupling structure of FIG. 2. FIG. 8A shows a light beam 210 entering prism 200 and being coupled to the waveguide 208 via a coupling through a portion of the BOX layer 204. FIG. 8B, on the other hand, shows a light beam 211, leaving the waveguide 208 and being coupled to the prism 200 via a coupling through the BOX layer 204. As described above, the BOX layer 104 should be thin enough (about 2500 Angstroms or less) to provide an adequate coupling between the prism 200 and the waveguide 208.

Figure 9:
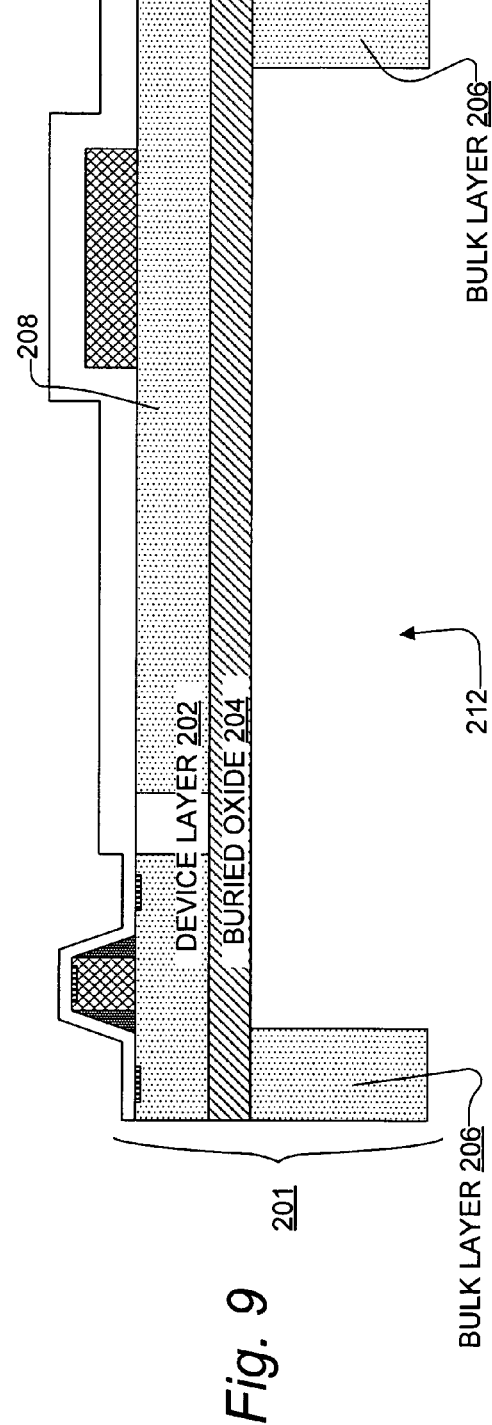
FIG. 9 is a cross section of an SOI substrate with a cavity located in the bulk layer for mounting a prism, according to an example.

FIG. 9 shows a cross section of the SOI substrate 201 that includes a cavity 212. The cavity 212 defines a location for the prism 200 to be bonded to and it also serves a similar function as the cavity 111, which includes promoting the truncation of light and confinement to the waveguide 108. The cavity 212 may also be formed in a similar manner as the cavity 111 using a variety of etching and lithography techniques.

Figure 10:
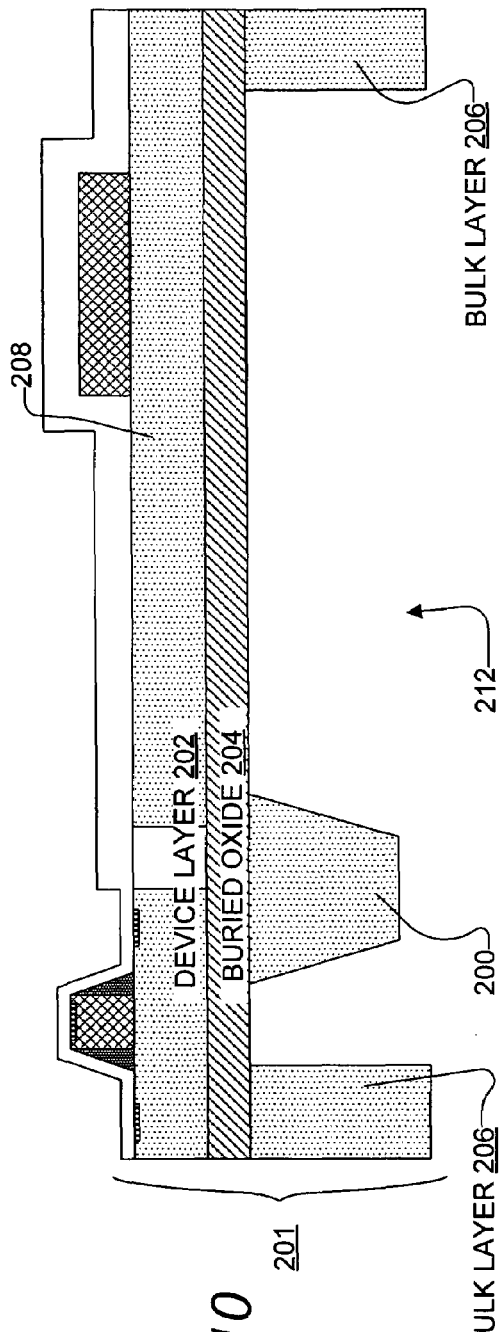
FIG. 10 is a cross section of a prism mounted in the cavity of FIG. 9.

FIG. 10 shows the prism 200 bonded to the BOX layer 204. The prism 200 may be bonded to the BOX layer 204 using a variety of conventional bonding techniques. When bonding the prism 200, processing parameters (such as temperature, pressure, etc.,) should be compatible with the materials and structures present in the optical coupling structure or within the SOI substrate 200. The configuration shown in FIG. 10 may be advantageous because the prism 200 does not interfere with top side optical and electronic elements, and metal and dielectric layers. Moreover, a variety of different types of prisms, even those that are made of a different material than silicon, may be incorporated into an optical coupling structure.

Figure 11:
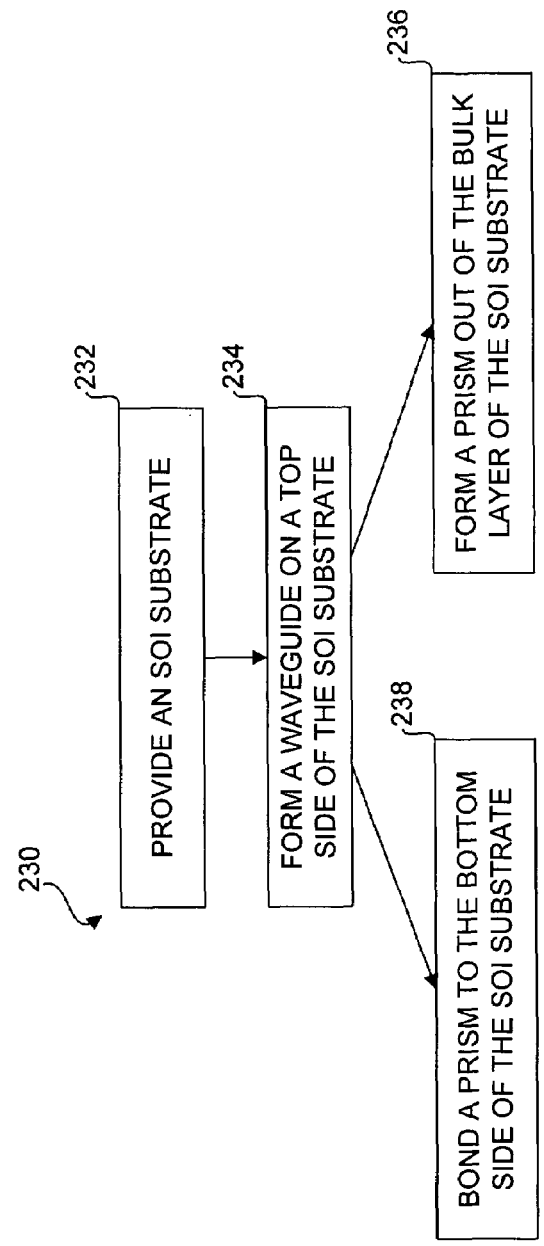
FIG. 11 is a flow diagram of a method of forming an optical coupling structure, according to an example.

As an overview, FIG. 11 show a flow diagram that illustrates in a simplified manner a method 230 for fabricating an optical coupling structure that comprises a waveguide optically coupled through a BOX layer with a prism. Method 230 may be carried out on a substrate at a variety of points of a semiconductor process. For instance, method 230 may be applied before front-end optical and electrical elements are formed, during front-end processing, during back-end processing, or after back-end processing has been completed.

At block 232, an SOI substrate is provided. The SOI substrate includes at least a BOX layer that is sufficiently thin to provide an adequate coupling. In one example this thickness is 2500 Angstroms or less. The SOI substrate may also have a specific bulk layer background doping so that if the prism is formed out of the bulk layer, the background doping may establish the index of the prism.

At block 234, a waveguide is formed on a top side of the SOI substrate. The device layer may be thinned (via an etch or a planarization process) and doped to provide desired waveguide thickness and index. As described above, a waveguide may include multiple layers.

The prism may be formed in the bulk layer at block 236 or bonded to the bottom side of the SOI substrate at block 238. As described above, a cavity may be formed that acts as a cladding layer and also promotes truncation at the BOX layer/prism interface. In order to accommodate the prism, the bottom side of the SOI substrate may be treated in a variety of ways, which includes chemically etching and cleaning and/or polishing the bottom side to facilitate patterning/and or bonding (a double side polished wafer may also be provided). At block 236, such treatment may provide a suitable bonding area for the prism. On the other hand, at block 238, the bulk layer may be thinned or planarized in order to provide a desired thickness of the prism. Although not shown, to reduce Fresnel losses, a prism may be coated with an anti-reflective coating.

It is important to note that the formation of the waveguide and the prism is not necessarily consecutive. The waveguide, for instance, may be formed early in the front-end of a semiconductor process and the prism may be formed later in a back-end process. Alternatively, the prism may be formed first, before front-end processing, and the waveguide may be formed at some later point. A variety of other formation scenarios exist.

A variety of other processing scenarios may create an optical coupling structure that uses a portion of the BOX layer of an SOI substrate to evanescently couple light between a prism located on the bottom of an SOI substrate with a waveguide located on top of the SOI substrate. In general, the optical structure may either provide light to an optoelectronic IC or transfer light out of the IC. It should be understood, however, that the BOX layer may be used to couple other optical elements.

The illustrated embodiments and related description are examples only and should not be taken as limiting the scope of the present invention. The term "tapered," for example, when referring to the surface of a prism should not be viewed as limiting. A variety of similar terms, such as angled, faceted, or sloped could be substituted. Moreover, although the disclosure uses a silicon based substrate and prism as an example, a variety of other semiconductor substrates and films may be used instead of silicon and silicon dioxide, such as GaAs, GaN, or InP, for example. In addition, the indexes of any of the above films may be tailored in order to effectively couple light into and out of a waveguide. For example, the index of the prism ($n_1$) may be larger than the indexes of both the waveguide ($n_3$) and the BOX layer ($n_2$). The claims should not be read as limited to the described order or elements unless stated to that effect. Therefore, all embodiments that come within the scope and spirit of the following claims and equivalents thereto are claimed as the invention.

We claim:

1. An optical coupling structure, comprising:
   a silicon-on-insulator substrate comprising a top side and a bottom side, wherein a buried oxide layer is interposed between the top side and the bottom side;
   a wave guide formed on the top side;
   a prism formed on the bottom side, wherein a portion of the buried oxide layer serves as a spacer between the prism and the waveguide; and
   a cladding region that is located in the substrate adjacent to the prism and aligned below the waveguide and the buried oxide layer.

2. The optical coupling structure as in claim 1, wherein the portion of the buried oxide layer promotes an optical coupling between the prism and the waveguide.

3. The optical coupling structure as in claim 1, wherein the waveguide is formed in a device layer and the prism is formed in a bulk layer.

4. The optical coupling structure as in claim 3, wherein the bulk layer has a first refractive index ($n_1$), the buried oxide layer has a second refractive index ($n_2$), and the device layer has third refractive index ($n_3$), and wherein $n_1 \geq n_3 > n_2$.

5. The optical coupling structure as in claim 1, wherein a thickness of the buried oxide layer is less than about 2500 Angstroms.

6. The optical coupling structure as in claim 1, wherein the cladding layer is selected from the group consisting of an oxide, a nitride, and air.

7. The structure of claim 1, wherein the cladding region is a cavity in the substrate.

8. A method for making an optical coupling structure, the method comprising:
   providing a silicon-on-insulator substrate that includes a top side and a bottom side, wherein a buried oxide layer is interposed between the top side and the bottom side;
   forming a waveguide on the top side; and
   forming a prism on the bottom side, wherein a portion of the buried oxide layer establishes a spacing between the prism and the waveguide; and
   forming a cladding region in the substrate adjacent to the prism and aligned below the waveguide and the buried oxide layer.

9. The method as in claim 8, wherein the portion of the buried oxide layer promotes an optical coupling between the prism and the waveguide.

10. The method as in claim 8, wherein the buried oxide layer is less than about 2500 Angstroms.

11. The method as in claim 8, wherein forming the prism on the bottom side comprises bonding the prism to the buried oxide layer.

12. The method as in claim 8, wherein the top side includes a device layer and the bottom side includes a bulk layer.

13. The method as in claim 12, further comprising:
    performing a first etch on the bulk layer that determines a location of the prism; and
    performing a second etch on the bulk layer that provides a tapered surface of the prism.

14. The method as in claim 13, wherein the first etch forms a cavity that is adjacent to the prism and located below the waveguide.

15. The method as in claim 14, further comprising:
    depositing a cladding layer in the cavity.

16. The method as in claim 12, further comprising forming a waveguide in the device layer.

17. The method of claim 8, wherein the cladding region is a cavity in the substrate.

18. An optical coupling structure, comprising:
    a silicon-on-insulator substrate including a top side and a bottom side, wherein a buried oxide layer is interposed between the top side and the bottom side of the silicon-on-insulator substrate;
    a first device located on the bottom side of the silicon-on-insulator substrate, wherein a portion of the buried oxide layer promotes an optical coupling of the first device to at least one device located on the top side of the silicon-on-insulator substrate; and a cladding region that is located in the substrate adjacent to the device and aligned below the at least one device on the top side of the silicon-on-insulator substrate and the buried oxide layer.

19. The optical coupling structure as in claim 18, further comprising:

a second device located on the top side of the silicon-on-insulator substrate, wherein the second device is configured to receive an electronic signal.

20. The optical coupling structure as in claim 19, wherein the first device is configured to receive an optical signal.

* * * * *